United States Patent [19]

Strickler

[11] Patent Number: 5,477,403
[45] Date of Patent: Dec. 19, 1995

[54] DISK DRIVE HAVING A CRASH STOP DETENT ACTUATOR LATCH

[75] Inventor: Mike Strickler, Boise, Id.

[73] Assignee: Hewlett-Packard Company, Palo Alto, Calif.

[21] Appl. No.: 826,325

[22] Filed: Jan. 24, 1992

[51] Int. Cl.[6] ............................................... G11B 21/22
[52] U.S. Cl. ............................................................. 360/105
[58] Field of Search ....................................... 360/105, 106

[56] References Cited

U.S. PATENT DOCUMENTS

| | | | |
|---|---|---|---|
| 4,562,500 | 12/1985 | Bygdnes | 360/105 |
| 5,003,422 | 3/1991 | Sun et al. | 360/106 |
| 5,012,371 | 4/1991 | Pollard et al. | 360/105 |
| 5,023,736 | 6/1991 | Kelsie et al. | 360/105 |
| 5,117,318 | 5/1992 | Immler et al. | 360/106 |
| 5,134,608 | 7/1992 | Strickler et al. | 360/105 |
| 5,187,627 | 2/1993 | Hickox et al. | 360/105 |

FOREIGN PATENT DOCUMENTS 0411552 2/1991 European Pat. Off. ............ 360/106

Primary Examiner—Stuart S. Levy
Assistant Examiner—Craig A. Renner
Attorney, Agent, or Firm—E. F. Oberheim

[57] ABSTRACT

A disk drive crash stop/actuator latch combines a crash stop structure with a detent actuator latch which is engaged and latched in a selected radial limit position of the actuator and which is released by the simple expedient of pulsing the actuator motor. The detent actuator latch has a flexible cantilever latch arm secured at one end to the disk drive base. A crash stop face on the distal end of the cantilever latch arm is impacted by a surface on a catch member on the actuator in the radial limit. The cantilever latch arm is bowed between its ends to reduce long column stability to slightly yield to compression loads due to actuator impact. The crash stop face and the surface of the catch member on the actuator are in contact when the detent actuator latch is engaged. A pulse generator coupled to the actuator motor pulses the actuator motor in a sense to drive the actuator away from the crash stop face, overcoming the restraining force of the engaged detent actuator latch.

10 Claims, 2 Drawing Sheets

DISK DRIVE HAVING A CRASH STOP DETENT ACTUATOR LATCH

FIELD OF THE INVENTION

TECHNICAL FIELD

This invention relates generally to disk drives having actuator locks which lock the actuator in an inner or outer radial position, for example, a parked position.

BACKGROUND OF THE INVENTION

Disk type recording devices, whether magnetic, magnetoresistive or magnetooptical types, are high precision devices requiring the precise location and support of parts which interact in the positioning of a transducer head for recording or reading purposes. The recording devices are fabricated in a clean environment or cleaned prior to assembly in a clean environment and require a clean environment in which to function. Disk type recording devices such as memory devices comprise at least one disk on which servo code and/or digital data is recorded in concentric or spiral tracks. At least one transducer mounted on a moveable actuator is moved to a selected radial position to access selected data, which in a disk memory drive is usually at the request of a host computer.

The recorded tracks are bounded by tracks at inner and outer radial positions on a disk surface. Actuator movement is limited by limit stops or crash stops, which limit transducer displacement to inner and outer radial positions, at least radially inwardly and radially outwardly of the radial positions of those inner and outer tracks upon which data is recorded. The function of these crash stops is to absorb the impact energy of the actuator thereagainst and to stop the actuator in the shortest possible distance without exceeding the acceleration force limits of the transducers and the transducer supports in the designed operational environment.

To prevent damage due to shock forces, disk drives are provided with actuator restraining devices or locks which secure the actuator in one of two radial limits of movement, inner or outer, to prevent uncontrolled actuator movement when the disk drive is not in use, the object being to avoid dragging the transducers in contact with the disk surface across the tracks. Typically, this locked position places the transducers in a radial zone outside of the recorded tracks reserved for parking, taking off, and loading, so as to eliminate transducer sliding over recorded tracks and damaging the data, and/or recording surface.

These actuator locks, by way of example, operate according to various technical principles including, magnetic, electromagnetic, mechanical, aerodynamic, and combinations thereof.

U.S. Pat. Nos. 4,538,193 and 4,647,997 describe actuator locks having latches which are spring biased to latched position and which are aerodynamically released. U.S. Pat. No. 4,692,829 describes an actuator having a latch which is magnetically repelled to latch position and aerodynamically released. U.S. Pat. No. 5,036,416 describes an actuator having a latch which is magnetically attracted or spring loaded to latched position and which is aerodynamically released.

These latches while functionally effective in locking and unlocking the actuator, involve numerous parts which add to the complexity of the drive, to the inventory costs, to the assembly costs, and finally to the maintenance costs. Reliability in real life applications is suspect. Such added complexity increases the power consumption of the spindle motor.

SUMMARY OF THE INVENTION

Improvement is provided according to this invention in the provision of a crash stop actuator lock mechanism which functions both as an actuator lock and as an actuator crash stop. This crash stop actuator lock embodies a detent type of lock mechanism which is engaged in the crash stop position of the actuator. The detent actuator lock is forcibly released by pulsing the coil of the actuator motor. In the best mode configuration of the actuator lock mechanism, a single piece flexible cantilever latch arm is secured to the drive base. This arm has one part of the detent lock and a catch member on the actuator has the mating part of the detent lock. The detent lock comprises sloping faces which mate in the crash stop position and which are not self locking but which under the engagement forces of the flexible latch arm, provide latching restraint in a degree securing the actuator against movement in the presence of forces up to those which are otherwise destructive of the drive, but which may be separated to release the actuator after the disks of the disk drive are rotating at operating speed, by electrically pulsing the actuator drive motor.

In the best mode configuration, the latch arm is outsert molded of a flexible plastic material, as a single piece, having a part extending through a hole in the support plate or the base of the drive, which secures the cantilever crash stop arm dimensionally precisely with respect to the catch member on the actuator. The crash stop face being an integral part of the latch arm, obviates dimensional tolerance variations in fabrication and, in operation, minimizes dimensional tolerance variation or buildup, between the latch detent and the crash stop.

One part of the detent lock is located at or adjacent the free end of the cantilever latch arm. The free end of the cantilever latch arm is laterally displaced by the detent lock parts during actuator motion to engage or release the detent lock. The detent lock is engaged when the crash stop face on the cantilever latch arm engages a crash stop face on the catch member on the actuator. The cantilever latch arm accepts the crash stop loads in compression (or tension), upon impact of the crash stop faces, in which the primary component of the crash stop force is directed through the center of the point of attachment of the cantilever latch arm to the base or support of the drive.

BRIEF DESCRIPTION OF THE DRAWINGS

The invention will be better understood by reference to the following specification when considered in conjunction with the accompanying drawings, in which.

BEST MODE FOR CARRYING OUT THE INVENTION

The best mode presently known to the applicant for practicing this invention comprises its application in a rotary actuator type of magnetic disk drive, as illustrated and described herein. Applications to linear actuator disk member drives will be readily apparent to those skilled in the art.

Figure 1:
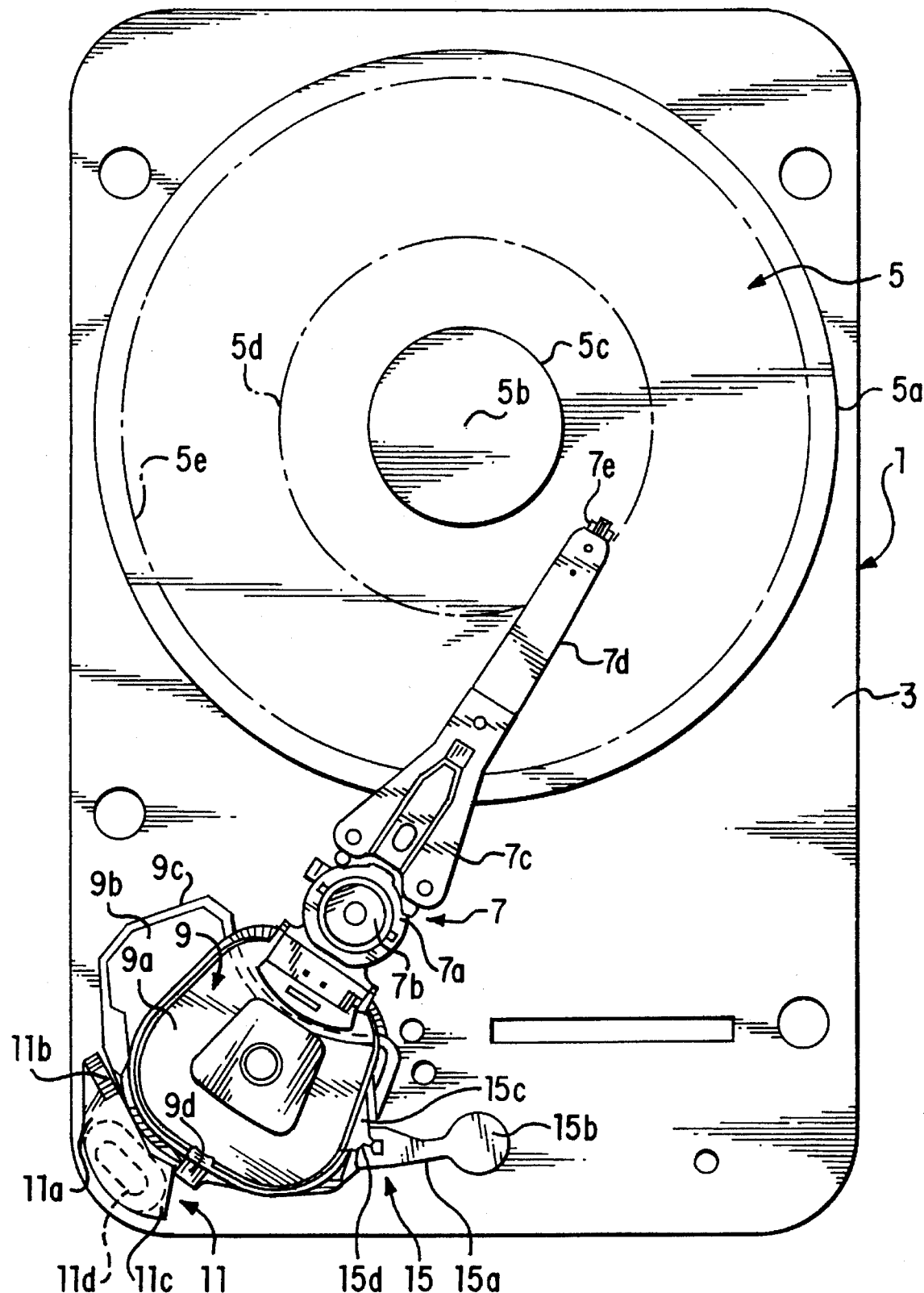
FIG. 1 is a plan view of a rotary actuator disk drive illustrating one embodiment of this invention.

As seen in the drawings, and with particular reference to FIG. 1, this rotary actuator disk drive, generally designated 1, comprises a base or support plate 3, a disk stack 5 and an actuator 7.

Figure 3:
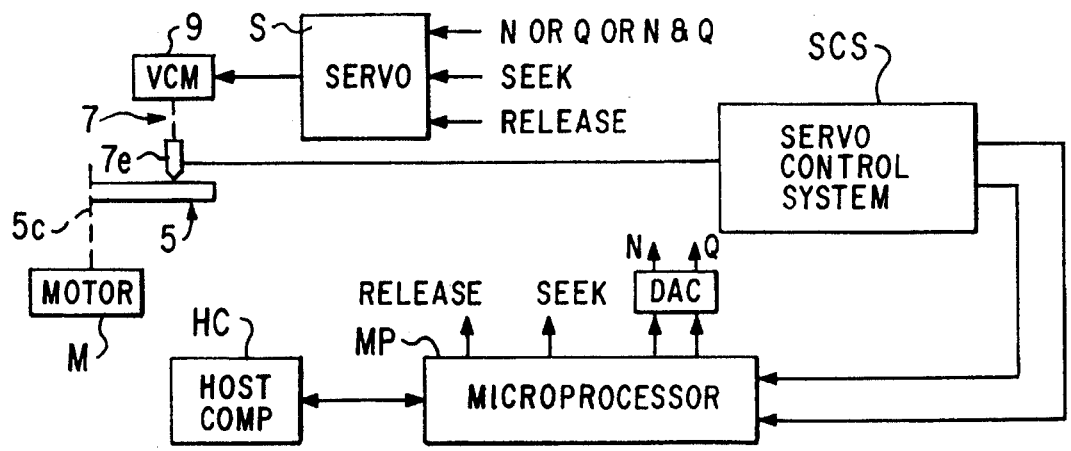
FIG. 3 is a block diagram schematically illustrating the control function for the crash stop actuator lock.

The disk stack 5 is mounted for rotation at constant speed by a motor M, as seen in FIG. 3 for example, about an axis 5b of a disk spindle structure 5c secured to the base 3.

A rotary actuator 7 comprises a bearing housing 7a which is rotatably mounted about the spindle 7b which is also secured to the base plate 3. Arms 7c, forming part of an armstack, are mounted upon the bearing housing 7a in axially spaced positions in planes adjacent to the surfaces of the individual disks 5a and, in operation, project between the disks. Load beams 7d, sometimes also referred to as flexures, are individually attached to the free end of each arm 7c at its extremity. Each load beam mounts an individual transducer 7e, such as a magnetic head. Each transducer 7e is disposed in confronting relationship with the adjacent surface of one disk 5a. The actuator 7 is rotated about the spindle 7b by an actuator motor 9, forming part of a servo system, FIG. 3, to move the transducer 7e across the tracks between the track boundaries 5d and 5e, and then to position the transducer 7e at a selected track, for track seeking and track following modes of operation, respectively, as is well known.

This actuator motor 9 comprises a coil structure 9a. The coil structure 9a is attached to the bearing housing 7a and the centerline of the coil structure is preferably diametrically disposed with respect to the center line of the arms 7c and the load beams 7d on the opposite sides of the axis of the actuator 7 spindle 7b. In this position the coil structure 9a moves bidirectionally in an arc about the axis of the actuator spindle 7b. The coil structure 9a is disposed between a pair of permanent magnets, one above and one below the coil structure 9a. Only one of the two pole permanent magnets 9b is needed to demonstrate operation. Only the lower permanent magnet is therefore shown in these illustrations in the interest of clarity. The lower permanent magnet 9b is disposed upon a steel motor base 9c which is attached to the base plate 3. Bidirectional movement of the coil structure 9a in its arc in the field of the permanent magnet is achieved, as is well known, by reversibly energizing the coil of the coil structure 9a.

Figure 2:
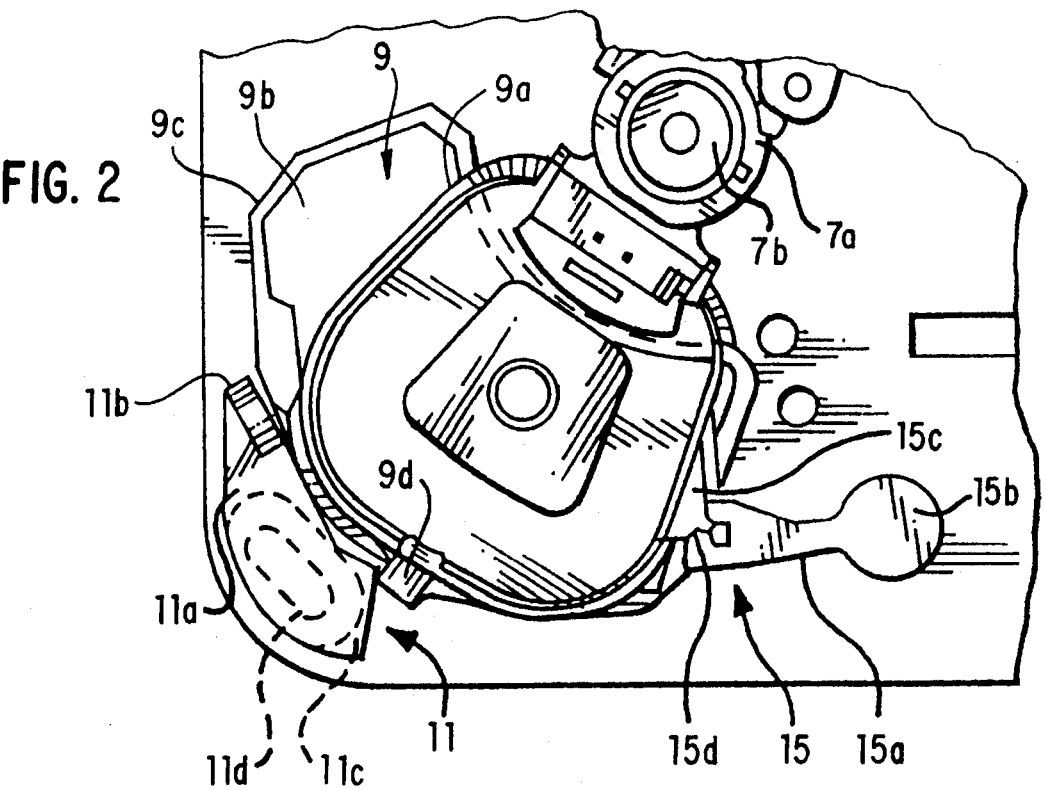
FIG. 2 is an enlargement of a fragmentary portion of FIG. 1 to provide a clear illustration of the relationship of the actuator crash stop latch member with respect to the actuator.
Figure 2A:
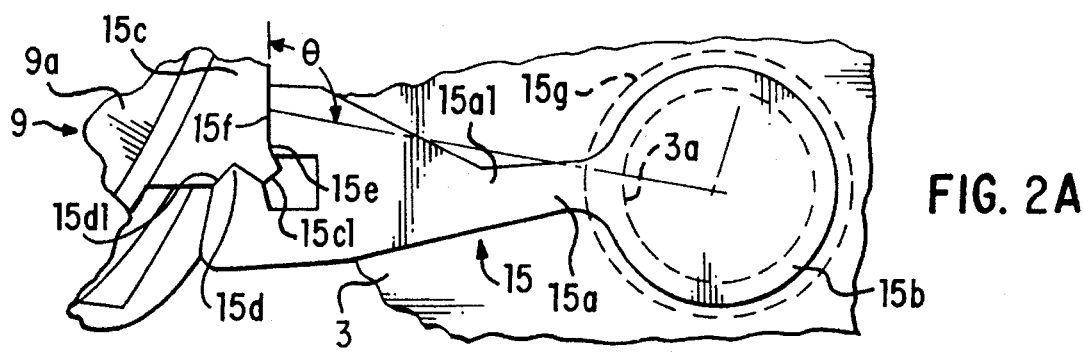
FIG. 2A is an enlargement of the crash stop/actuator lock clearly illustrating the detent lock.

Referring now to FIG. 2 and 2a, a crashstop/actuator lock structure 15 comprises a cantilever latch arm 15a connected to a base post 15b. A catch member 15c is secured to the coil structure 9a. A detent lock 15d comprises a laterally projecting angular projection on the crashstop/cantilever latch arm 15a. A mating angular recess 15d1 is provided in the catch member 15c. A crashstop face 15e on the distal end of the latch arm 15a disposed substantially perpendicularly to a line passing through that face and intersecting the center of the post 15b, confronts and engages a matching face 15f on the crashstop catch member 15c when the actuator 7 is in that limit of crashstop position. When the crashstop faces are engaged, the detent lock is engaged. During movement of the actuator to park position, a face 15c1 on the catch 15c engages the detent lock 15d and laterally deflects the distal end of the latch arm 15a as the actuator moves to park position.

The cantilever arm 15a, in the best mode presently known for practicing the invention, is of a flexible plastic material and is outsert molded on the base plate 3. A hole 3a is provided in the base plate 3 as seen in FIG. 2a. The cantilever arm 15a and the post 15b are cast or molded as an integral part through the hole 3a. A flange 15g, or another molded part having a function in the structure or operation of the disk drive, secures this integral assembly.

More conventional structures for the cantilever latch arm, including journalling the post 15b in the base 3, or securing the post 15b in the base 3 and journalling the cantilever latch arm 15a to the post 15b, and in both instances employing spring biasing or magnetic biasing of the cantilever latch arm against a limit stop, are readily apparent from the patents referenced above.

In the illustrated embodiment of this invention, the crash stop structure receives the crash stop forces in compression. The crash stop face is preferably disposed at an angle with respect to a line from that face through the center of the post 15b, so that, either there is no lateral component of crash stop force at that location or there is a small lateral component acting in a direction to engage the detent lock, ie, seat the detent projection in the detent recess. To this end the crash stop faces 15e and 15f define an obtuse angle θ with the line therefrom through the center of the post 15b. The primary crash stop impact force acts perpendicularly to these faces in the direction toward the post 15b but to one side thereof. A major component of the crash stop force acts along the line from the crash stop faces, 15e, 15f through the center of the post 15b. A small lateral component acts in the direction tending to rotate the cantilever latch arm 15a counterclockwise.

The cantilever crash stop arm 15a is provided with a flexible section 15a1 adapted to bend to permit counter clockwise movement of the detent end of the latch arm 15a so that the detent lock 15d may be disengaged. The latch restraint is preferably sufficient to secure the actuator in a latched position in the presence of shock forces approaching those destructive of disk drive parts and functions. The detent lock is released by electrically pulsing the coil of the actuator motor 9. During clockwise movement of the actuator 7, in response to electrical pulsing of the motor 9, the crash stop faces, 15e, 15f, separate as the catch member 15c pulls away and the detent end of the cantilever latch arm moves downwardly, rotating, in effect, about a point in the flexible section 15a1 of the cantilever latch arm 15a. The upper edge or end of the crash stop face 15e clears the adjacent crash stop face 15f and the actuator 7 is released.

The cantilever latch arm 15a necessarily requires a flexible section 15a1 to permit lateral movement of its detent end since the post 15b is secured against all movement on and through the base 3. The cantilever latch arm 15a may also be designed to permit bending in the flexible section 15a1 in compression to permit limited displacement of the crash stop face 15e in the direction of the post 15b, to permit stopping of the actuator over a limited distance and thereby lessen the deceleration forces acting on the actuator assembly, especially the magnetic heads, which in the rotary actuator structure have the highest tangential velocity. Instead of designing the cantilever latch arm as a straight arm, it may be designed, as shown, so that the flexible section 15a1 is offset from the center line between the crash stop face 15e and the center of the post 15b. This reduces long column stability and permits flexing in the presence of compression loads.

While it is preferred to employ the crash stop/actuator latch mechanism 15 in a configuration subject to compressional crash stop loads, it is readily apparent that the structural design of the detent end of the cantilever latch arm 15a may be reconfigured to place the arm in tension. In such instance, the crash stop face is reversed to cooperate, for example, with a catch member, which may form part of a crash stop member 9d, as seen in FIGS. 1 and 2.

FIGS. 1 and 2 also show the crash stop structure for the outer radial limit of the actuator 7. This structure comprises the crash stop 11 having a base 11a and a crash stop arm 11b which intercepts the catch 9d to limit the outer radial movement of the magnetic heads. This structure is integrally cast or molded through a hole 11d in the base 3 and is secured by a flange 11c on the bottom side of the base. The catch 9d on the outer radial end of the coil housing 9a limits angular movement of the actuator in which limit the magnetic heads are in their outer radial limits.

Suitable crash stop materials include flexible plastic material which may be outsert molded as integral structures on the base 3. Polycarbonate is employed in such an application. Any moldable plastic material exhibiting dimensional stability, flexibility and mechanical stress capacity to withstand forces (tension or compression) within design constraints for the application, is suitable for this application.

A typical disk drive system appears in FIG. 3. A microprocessor MP in response to requests for information from a host computer HC provides electrical outputs for controlling a servo S which in turn controls the actuator motor 9 of the actuator 7 for controlling the magnetic head 7e. The servo, the actuator motor 9, magnetic head 7e, servo control system SCS and the microprocessor define a closed loop servo control system for controlling the magnetic head 7e in both track seeking and track following modes of operation. Assuming that the motor M is rotating the magnetic disk 5 at operating speed, requests from the host computer for information received by the microprocessor are converted into signals identifying a particular track on the disk at which the requested information is stored. This initiates the seek mode of operation of the servo system. The seek signals are coupled to the servo S as indicated and the servo powers the motor 9 to move the actuator, placing the magnetic head 7e at the requested track. The track crossing signals in this seek mode, which are fed back from the magnetic head 7e via the servo control system to the microprocessor, provide the microprocessor with information as to the location of the magnetic head at the selected track. This ends the seek mode of operation.

During track following the signals N and Q produced by the microprocessor provide track following control. As indicated either the signals N or the signals Q or both the signals N and Q may be employed in a track following mode of operation.

When the system is to be shut down, according to the embodiment of the invention illustrated herein, the actuator is powered by the servo and the motor 9 to move the magnetic heads into the inner radial limit at which position the magnetic heads are to be parked. In this position, the crash stop actuator latch 15 is engaged and latches the actuator in this position. Thereafter the motor M which drives the disks is deenergized and as the disks slow down the magnetic heads land on the disk surface in the inner radial parking area.

When the system is to be operated the motor M is brought up to speed and the disks rotate at operating speed which is a constant speed. At this operating speed, the magnetic heads fly on the air bearing which is the thin film of air clinging to and moving with the surface of the disk. Operation of the disk drive is now accomplished by coupling the release signal to the servo. The release signal produced by the microprocessor or other release signal source is an electrical pulse which is of sufficient magnitude and duration and repetition, if needed, to power the motor 9 so that the catch on 15c pulls free of the detent lock 15d. Thus the actuator is released from the crash stop/actuator latch mechanism and is freed to be powered by the closed loop servo system for operation within the angular limits required for data recording or retrieval. These limits are less than the angular limits provided by the crash stop 11 and the crash stop/actuator latch 15.

Although the invention has been described in connection with a single physical embodiment thereof it is evident that various modification with respect to structural details, materials, crashstop/actuator latch operation in a tension mode rather than a compression mode and the application of the crashstop/actuator latch structure 15 to a linear actuator rather than a rotary actuator are easily accomplished within the level of skill in the art.

What is claimed is:

1. A disk drive, comprising:
   a. a support;
   b. at least one rotatable memory disk on said support;
   c. at least one transducer;
   d. a movable actuator on said support for supporting said transducer adjacent a surface of said disk;
   e. an actuator motor for moving said movable actuator and said transducer between inner and outer radial limits with respect to the surface of said disk;
   f. a detent actuator latch for engaging and latching said movable actuator in one of said inner and outer radial limits, said detent actuator latch having two relatively displaceable parts, a first part on said movable actuator and a second part on said support, said second part having a crash stop face for engaging a surface on said movable actuator, said two parts of said detent actuator latch when engaged latching said movable actuator in said one of said radial limits with said crash stop face engaging said surface of said movable actuator, and
   g. an electrical pulse generator for electrically pulsing said actuator motor to apply intermittent forces to said movable actuator to relatively displace and disengage said first part and said second part of said detent actuator latch and release said movable actuator.

2. The disk drive according to claim 1, in which:
   a. said first part of said detent actuator latch comprises a catch member and said second part of said detent actuator latch comprises an elongated latch member having said crash stop face on one end thereof; said one end of said elongated latch member being displaceable to engage and disengage said catch member, one member having a detent projection thereon and the other member having a mating detent depression thereon.

3. The disk drive according to claim 2, in which:
   a. said detent projection is on said one end of said elongated latch member adjacent said crash stop face, and
   b. a connector on said elongated latch member, located at a point thereon displaced from said projection, connecting said elongated latch member to said support.

4. The disk drive according to claim 3, in which:

a. said elongated latch member comprises a flexible material, and b. said connector immovably connects said displaceable latch member at said point to said support, flexibility of said flexible material permitting displacement of said one end of said elongated member.

5. A disk drive, comprising:

a. a support;

b. at least one rotatable memory disk on said support;

c. at least one transducer;

d. a movable actuator on said support for positioning said transducer at different radial locations on said disk between an outer radial limit and an inner radial limit;

e. a flexible cantilever arm secured at one end to said support and having a distal end opposite said one end;

f. a crash stop end face on said distal end of said cantilever arm for engaging a surface on said actuator when said actuator is in one radial limit, and g. a detent latch comprising two detent parts, a first detent part on said flexible cantilever arm at said distal end and a second detent part on said actuator, relative movement of said detent parts during engagement and disengagement movement being in a direction substantially transversely of said cantilever arm and correspondingly laterally displacing said distal end of said flexible cantilever arm, said actuator surface engaging said crash stop end face when said detent latch is engaged.

6. The disk drive according to claim 5, in which:

a. said cantilever arm has a longitudinal axis between said one end and said distal end, said crash stop end face being substantially perpendicular to said longitudinal axis.

7. The disk drive according to claim 6, in which:

a. said cantilever arm being bowed between said one end and said distal end, laterally offsetting an intermediate portion of said cantilever arm with respect to said longitudinal axis to reduce long column stability and increase yieldability in compression;

b. impact of said movable actuator on said crash stop end face applies a compression force to said cantilever arm acting substantially along said longitudinal axis.

8. The disk drive according to claim 7, in which:

a. said crash stop end face, in said substantially perpendicular position with respect to said longitudinal axis, is angularly offset in a direction to introduce a component of actuator impact force acting laterally of said cantilever arm at said distal end in a direction to engage said two detent parts of said detent latch.

9. A disk drive, comprising:

a. a support having an opening therethrough;

b. at least one rotatable memory disk on said support;

c. at least one transducer;

d. a movable actuator on said support for supporting said transducer adjacent a surface of said disk;

e. an actuator motor for moving said movable actuator to move said transducer between inner and outer radial limits with respect to a surface of said disk;

f. a detent actuator latch for engaging and latching said actuator in one of said inner and outer radial limits, said detent actuator latch comprising a catch member on said movable actuator and a flexible integral elongated latch member, said elongated latch member being of a flexible plastic material, an integral part of said elongated latch member extending through said opening in said support and terminating in an enlarged end and thereby being immovably secured in said opening in said support, forming a flexible elongated cantilever latch member having a distal end positioned adjacent said catch member, flexibility of said flexible material permitting displacement of said distal end of said cantilever latch member relative to said catch member;

g. a detent projection on said distal end of said cantilever latch member;

h. a mating depression on said catch member, said depression being mated to said projection;

i. a crash stop face on said distal end of said cantilever latch member for engaging a surface on said catch member on said movable actuator, said detent projection and said detent depression when engaged latching said movable actuator in said one of said radial limits with said crash stop face engaging said surface of said catch member on said movable actuator, and j. an electrical pulse generator for electrically pulsing said actuator motor to apply intermittent forces to said movable actuator to move said movable actuator and to relatively displace and disengage said detent on said distal end of said cantilever latch member from said depression on said catch member and thereby to release said movable actuator.

10. A disk drive, comprising:

a. a support having an opening therein;

b. at least one rotatable memory disk on said support;

c. at least one transducer;

d. a movable actuator on said support for supporting said transducer adjacent a surface of said disk;

e. an actuator motor for moving said movable actuator to move said transducer between inner and outer radial limits with respect to a surface of said disk;

f. a detent actuator latch for engaging and latching said actuator in one of said inner and outer radial limits, said detent actuator latch comprising a catch member on said movable actuator and a flexible integral elongated latch member, said elongated latch member being of a flexible plastic material, an integral part of said elongated latch member being immovably secured in said opening in said support, forming a flexible elongated cantilever latch member having a distal end positioned adjacent said catch member, flexibility of said flexible material permitting displacement of said distal end of said cantilever latch member relative to said catch member;

g. a detent projection on said distal end of said cantilever latch member;

h. a mating depression on said catch member, said depression being mated to said projection;

i. a crash stop face on said distal end of said cantilever latch member for engaging a surface on said catch member on said movable actuator, said detent projection and said detent depression when engaged latching said movable actuator in said one of said radial limits with said crash stop face engaging said surface of said catch member on said movable actuator, and j. an electrical pulse generator for electrically pulsing said actuator motor to apply intermittent forces to said movable actuator to move said movable actuator and to relatively displace and disengage said detent on said distal end of said cantilever latch member and said depression on said catch member and thereby to release said movable actuator.

* * * * *